(12) United States Patent
Park et al.

(10) Patent No.: US 9,086,687 B2
(45) Date of Patent: Jul. 21, 2015

(54) SMART WATCH AND METHOD FOR CONTROLLING THE SAME

(71) Applicant: LG ELECTRONICS INC., Seoul (KR)

(72) Inventors: Hyorim Park, Seoul (KR); Doyoung Lee, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 13/923,950

(22) Filed: Jun. 21, 2013

(65) Prior Publication Data

US 2014/0334271 A1 Nov. 13, 2014

(30) Foreign Application Priority Data

May 7, 2013 (KR) .......................... 10-2013-0051503

(51) Int. Cl.
   G06F 3/045 (2006.01)
   G04G 21/04 (2013.01)
   G06F 3/041 (2006.01)
   G04C 3/00 (2006.01)

(52) U.S. Cl.
   CPC ................ G04G 21/04 (2013.01); G06F 3/041 (2013.01); G04C 3/002 (2013.01)

(58) Field of Classification Search
   USPC ......... 345/156, 173, 174; 455/66, 550; 705/2; 702/141
   See application file for complete search history.

(56) References Cited

U.S. PATENT DOCUMENTS

| | | | | |
|---|---|---|---|---|
| 7,081,905 | B1* | 7/2006 | Raghunath | 345/684 |
| 2002/0068600 | A1* | 6/2002 | Chihara et al. | 455/550 |
| 2002/0081976 | A1* | 6/2002 | Fujisawa et al. | 455/66 |
| 2007/0294105 | A1* | 12/2007 | Pierce | 705/2 |
| 2008/0300055 | A1* | 12/2008 | Lutnick et al. | 463/39 |
| 2013/0293494 | A1* | 11/2013 | Reshef | 345/173 |
| 2014/0107493 | A1* | 4/2014 | Yuen et al. | 600/473 |
| 2014/0181954 | A1* | 6/2014 | Robertson et al. | 726/17 |
| 2014/0200847 | A1* | 7/2014 | Singiresu et al. | 702/141 |

FOREIGN PATENT DOCUMENTS

| | | |
|---|---|---|
| JP | 2000-209318 A | 7/2000 |
| KR | 0120590 Y1 | 2/1997 |
| KR | 10-2010-0130478 A | 12/2010 |
| KR | 10-2011-0022254 A | 3/2011 |
| WO | WO 2004/049686 A1 | 6/2004 |

* cited by examiner

*Primary Examiner* — Thuy Pardo
(74) *Attorney, Agent, or Firm* — Birch, Stewart, Kolasch & Birch, LLP

(57) ABSTRACT

Discussed are a smart watch and a method for controlling the same, which determine a notification device that provides a notification of an event, based on wearing/non-wearing of a smart watch and on a distance between the smart watch and an external digital device. The smart watch includes a display unit configured to display content, a sensor unit configured to detect an input signal and transmit the detected input signal to a processor, a communication unit configured to transmit/receive data, and the processor configured to control the display unit, the sensor unit, and the communication unit, wherein the processor is configured to detect a mode of the smart watch, wherein the mode of the smart watch includes a worn mode and an unworn mode of the smart watch.

18 Claims, 9 Drawing Sheets

FIG. 3
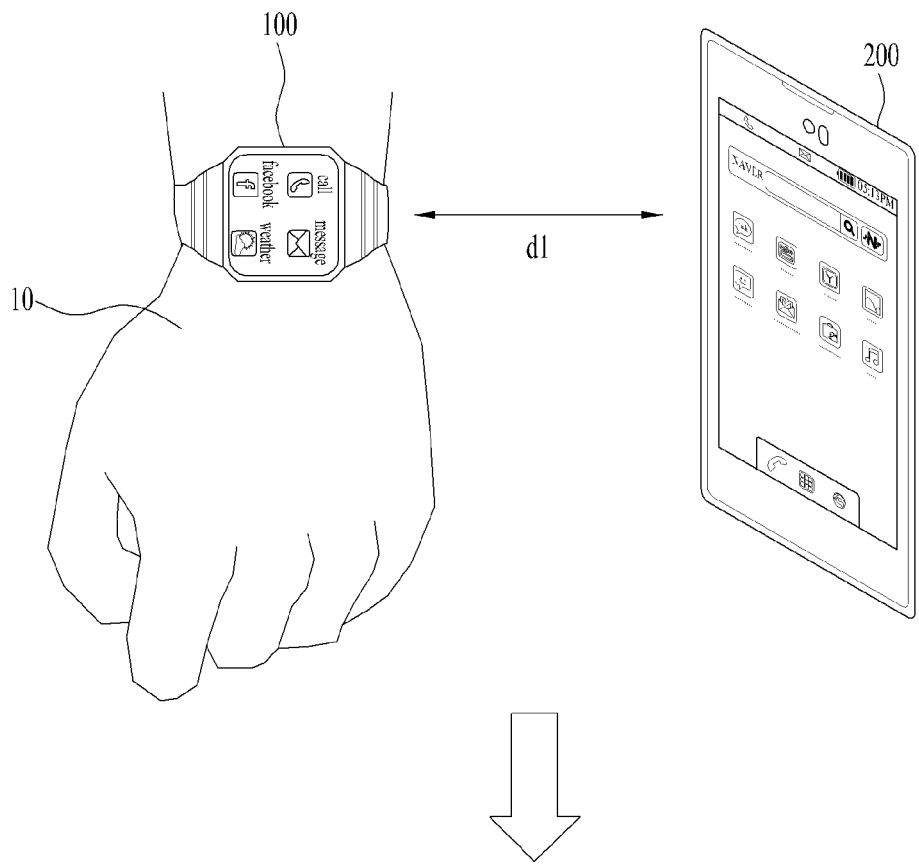
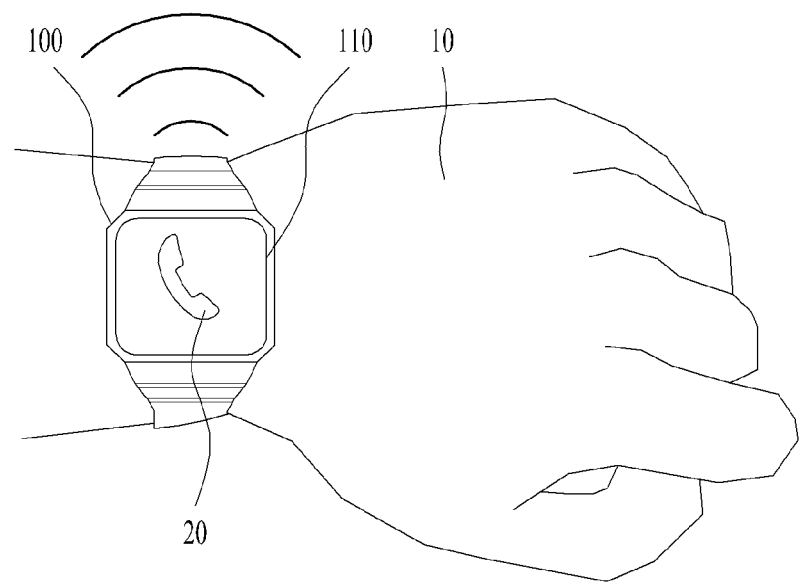

FIG. 6
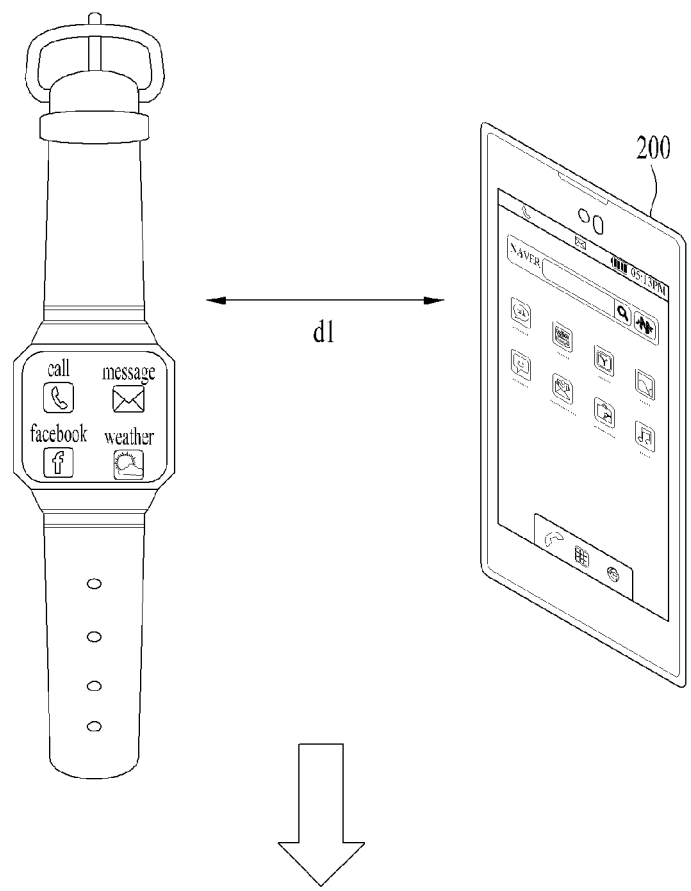
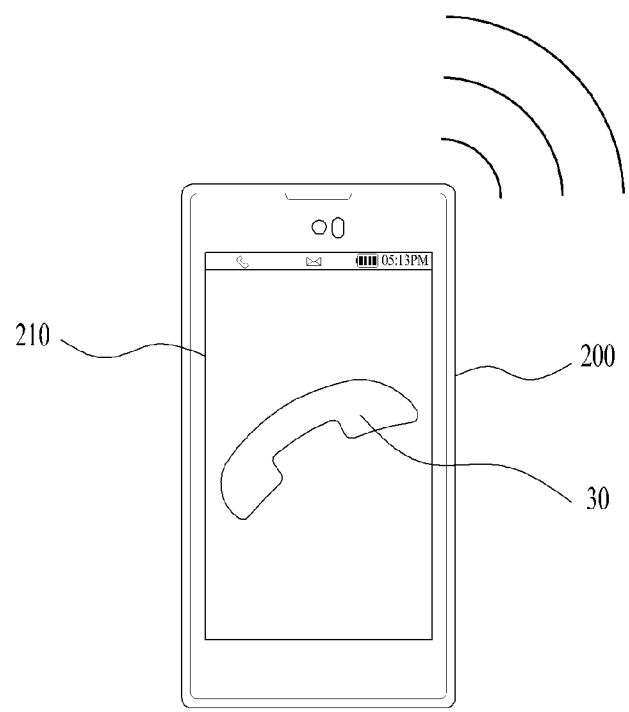

SMART WATCH AND METHOD FOR CONTROLLING THE SAME

Pursuant to 35 U.S.C. §119(a), this application claims the benefit of Korean Patent Application No. 10-2013-0051503, filed on May 7, 2013, which is hereby incorporated by reference as if fully set forth herein.

BACKGROUND OF THE INVENTION

1. Field of the Invention

The disclosure relates to a smart watch and a method for controlling the same, and more particularly, to a method for determining a notification device that provides a notification of an event, based on whether a smart watch is being worn or not and on a distance between the smart watch and an external digital device.

2. Discussion of the Related Art

With advances in technology, development of wearable computers has accelerated. Wearable computers refer to computers that a user can naturally wear like clothes, wristwatches, glasses, or accessories. Although smart phones and tablet PCs may be conveniently used using user fingers or a touch pen, they may be inconvenient in that the user has to put them in a pocket or bag or carry such devices. On the contrary, the user can wear a wearable computer on the wrist or on the eyes like glasses, thereby providing convenience in mobility relative to the smart phone or tablet PC. In particular, among wearable computers, a variety of wristwatch related products, for example, a smart watch, capable of wirelessly providing various services such as weather forecasts, messages, notifications, stock quotes, etc., have been emerged.

Meanwhile, a smart watch may be interlinked with an external digital device such as a smart phone. If an event occurs in the smart watch or an external digital device, whether the smart watch or the external digital device will notify a user of the event needs to be determined.

SUMMARY OF THE INVENTION

Accordingly, the disclosure is directed to a smart watch and a method for controlling the same that substantially obviate one or more problems due to limitations and disadvantages of the related art.

An object of the disclosure is to determine a notification device for providing a notification of an event occurring in at least one of a smart watch and a digital device, when the smart watch detects an external digital device paired therewith.

Another object of the disclosure is to determine a notification device based on at least one of wearing/non-wearing of a smart watch, pairing/unpairing between the smart watch and an external digital device, and a distance between the smart watch and the external digital device.

Still another object of the disclosure is to change a notification device when an input signal is not detected with respect to a notification provided by the notification device for a preset time.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a smart watch includes a display unit configured to display content, a sensor unit configured to detect an input signal and transmit the detected input signal to a processor, a communication unit configured to transmit/receive data; and the processor configured to control the display unit, the sensor unit, and the communication unit, wherein the processor is configured to: detect a mode of the smart watch, wherein the mode of the smart watch includes a worn mode and an unworn mode of the smart watch, detect an external digital device paired with the smart watch, and determine a notification device providing a notification of an event occurring in at least one of the smart watch and the external digital device based on the detected worn mode or unworn mode of the smart watch, wherein the notification device includes at least one of the smart watch and the external digital device.

In another aspect of the present disclosure, a method for controlling a smart watch includes detecting a mode of the smart watch, wherein the mode of the smart watch includes a worn mode and an unworn mode of the smart watch, detecting an external digital device paired with the smart watch, and determining a notification device providing a notification of an event occurring in at least one of the smart watch and the external digital device based on the smart watch worn mode or unworn mode, wherein the notification device includes at least one of the smart watch and the external digital device.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a diagram illustrating a first embodiment of a control method of a smart watch according to an embodiment of the disclosure;

FIG. 6 is a diagram illustrating a third embodiment of a control method of a smart watch according to an embodiment of the disclosure;

DETAILED DESCRIPTION OF THE INVENTION

Reference will now be made in detail to the preferred embodiments of the disclosure, examples of which are illustrated in the accompanying drawings. Wherever possible, the same reference numbers will be used throughout the drawings to refer to the same or like parts.

Although the terms used in the disclosure are selected from generally known and used terms while considering functions of the disclosure, they may vary according to intention or customs of those skilled in the art or to emergence of new technology. Some of the terms mentioned in the description of the disclosure may have been selected by the applicant at his or her discretion, and in such cases the detailed meanings thereof will be described in relevant parts of the description herein. Thus, the terms used in this disclosure should be interpreted based on the substantial meanings of the terms and the whole content of this disclosure rather than their simple names or meanings.

Embodiments will be described below in detail with reference to the attached drawings, which should not be construed as limiting the embodiments.

Figure 1:
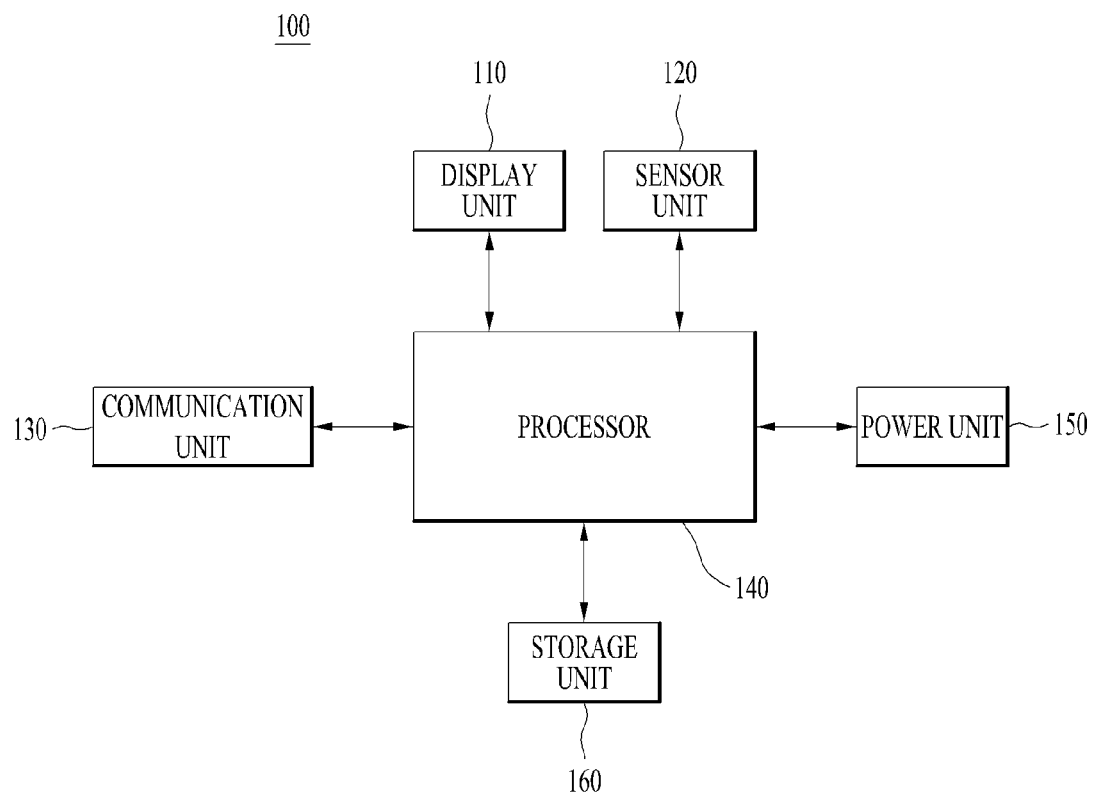
FIG. 1 is a block diagram of a smart watch of the disclosure.

FIG. 1 is a block diagram of a smart watch of the disclosure. Referring to FIG. 1, a smart watch 100 may include a display unit 110, a sensor unit 120, a communication unit 130, a processor 140, a power unit 150, and a storage unit 160.

The display unit 110 outputs an image on a display screen. The display unit 110 may output an image according to content executed in the processor 140 or a control command received from the processor 140. For example, the content may include a video, an image, etc. In the disclosure, the display unit 110 may provide a notification of an event occurring in at least one of the smart watch 100 and an external digital device. Particularly, the display unit 100 may display a notification occurred from at least one of the smart watch 100 and the external digital device as a character or image notification.

The sensor unit 120 may detect an input signal using at least one sensor equipped in the smart watch 100 and provide the input signal corresponding to a detection result to the processor 130. The sensor unit 120 may include a plurality of sensing means. In an embodiment, the plurality of sensing means may include a gravity sensor, a geomagnetic sensor, a motion sensor, a gyro sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a Global Positioning System (GPS) sensor, a grip sensor, a touch sensor, etc. The sensor unit 120 generically refers to any of these various sensing means. The sensor unit 120 may sense various user input and user environment and provide sensing results to the processor 130 so that the processor 130 may perform operations corresponding to the sensing results. The above-described sensors may be included as separate elements in the smart watch 100 or may be incorporated into one or more elements in the smart watch 100.

According to the disclosure, the sensor unit 120 may detect an input signal of the smart watch 100. The input signal of the smart watch 100 may correspond to an input signal for determining whether a user wears the smart watch 100. For example, the input signal may include at least one of an input signal for the rear surface (not shown) of the smart watch 100 and an input signal for a buckle (not shown) of the smart watch 100. According to this disclosure, the sensor unit 120 may detect the input signal while providing a notification of an event occurred in the smart watch 100. The input signal for the smart watch 100 may include eye gaze input, touch input, voice input, gesture input, etc. In this disclosure, the sensor unit 120 may also detect a user grip signal for the smart watch 100 under the state that the user does not wear the smart watch 100.

The communication unit 130 may communicate with an external device using various protocols and thus transmit/receive data to/from the external device. The communication unit 130 may be connected to a network wirelessly or by wire and transmit/receive digital data such as content. In this disclosure, the smart watch 100 may perform pairing with an external digital device using the communication unit 130. The smart watch 100 may perform communication with the external digital device through pairing. This will be described again with reference to FIG. 2. Meanwhile, the communication unit 130 may transmit a notification start signal to the external digital device when the external device is determined as a device that provides a notification.

The processor 140 may execute content received through data communication or stored in the storage unit 160. The processor 140 may control each unit of the smart watch 100 and control data transmission and reception between units.

In this disclosure, the processor 140 may detect a mode of the smart watch 100. The mode of the smart watch 100 may include a worn mode and a unworn mode. The mode of the smart watch 100 may be determined based on an input signal detected by the sensor unit 120 through at least one of the rear surface of the smart watch 100 and a buckle of the smart watch 100. In this disclosure, the processor 140 may detect an external digital device paired with the smart watch 100. In this disclosure, the processor 140 may determine a notification device that provides a notification of an event occurring in at least one of the smart watch 100 and the external digital device, based on the detected worn mode or unworn mode of the smart watch 100. Herein, the notification device may include at least one of the smart watch 100 and the external device. This will be described with reference to FIG. 2.

The power unit 150 is a power source connectable to an internal battery of the smart watch 100 or to an external power source, for supplying power to the smart watch 100.

The storage unit 160 may store various digital data including video, audio, pictures, applications, etc. The storage unit 160 may store programs for processing and controlling the processor 140 and serve to temporarily store input/output data. The storage unit 160 may include various digital data storage spaces such as a flash memory, a Random Access Memory (RAM), a Solid State Drive (SSD), etc.

Although not shown in FIG. 1, the smart watch 100 may include an audio unit. In this disclosure, the audio unit (not shown) may provide a speech notification of an event occurring in at least one of the smart watch and the external digital device.

As an embodiment of the disclosure, various operations performed by the smart watch 100 may be controlled by the processor 140. Operations of the smart watch 100 may be stored in the storage unit 160 and may be controlled by an application driven by the processor 140. For convenience, in the attached drawings and following description, such operations are illustrated and explained as being performed/controlled by the smart watch 100.

The smart watch 100 illustrated in FIG. 1 is shown in block form according to an embodiment. Separate blocks are logically distinguished elements in the smart watch 100. Therefore, the above-described elements of the smart watch 100 may be incorporated into one or more chips according to a device design.

Figure 2:
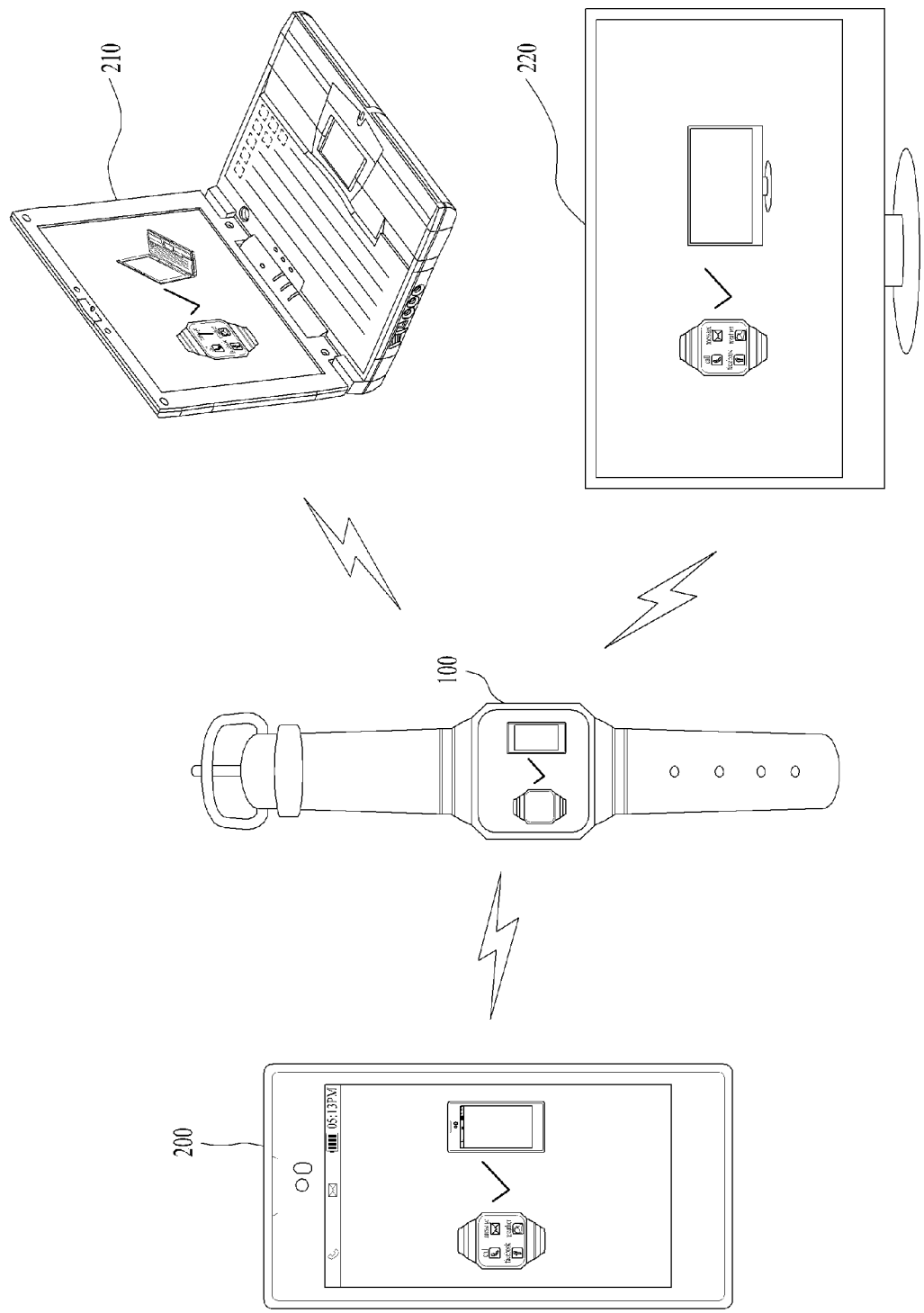
FIG. 2 is a diagram illustrating pairing of a smart watch with an external digital device.

FIG. 2 is a diagram illustrating pairing of a smart watch with an external digital device. More specifically, FIG. 2 illustrates pairing performed between the smart watch 100 and an external digital device 200 such as a smart phone. The external digital device 200 may be a digital device that can perform communication with the smart watch 100. For example, the external digital device 200 may include a smart phone, a notebook computer 210, an Internet Protocol Television (IPTV) 220, etc. as shown in FIG. 2.

Pairing refers to connection for data transmission/reception between the smart watch 100 and the external digital device 200. When pairing is performed, the smart watch 100 and the external digital device 200 communicate with each other to enable two-way data transmission/reception. In this disclosure, the smart watch 100 may be paired with the external digital device 200 using a communication unit (not shown). In addition, in this disclosure, pairing may be performed through Bluetooth, Near Field Communication (NFC), etc. As an example, pairing may be performed through user input using the smart watch 100 or the external digital device 200. The user input may include touch input and voice input. For example, the smart watch 100 may provide a separate button or a user interface for communication with the external digital device 200. The user may perform communication between the smart watch 100 and the external digital device 200 through user input using the button or the user interface.

If communication access is achieved, the smart watch 100 may exchange data with the external digital device 200 in a session open state. Meanwhile, the smart watch 100 may perform pairing with a plurality of external digital devices 200, 210, and 220. In this case, the smart watch 100 may achieve communication access through pairing and thus may selectively exchanges data with the plural external digital devices 200, 210, and 220.

The smart watch 100 may detect the paired external digital device 200 to determine a notification device that will provide a notification of an event occurring in the smart watch 100 or the external digital device 200. The notification device may be a device that provides a notification of an event occurring in at least one of the smart watch 100 and the external digital device 200. In this disclosure, the notification device may include at least one of the smart watch 100 and the external digital device 200.

The event occurring in at least one of the smart watch 100 and the external digital device 200 may be a state change occurred from at least one of the smart watch 100 and the external digital device 200. For example, the event may include an incoming telephone call, text message reception, new message reception of a Social Networking Service (SNS), scheduled alarm, weather alert, etc. The notification of the occurred event may include notifying the user of the above-described event. For example, the notification may be occurred in the form of a text message notification, a speech notification, a vibration notification, etc. The notification device may be determined according to whether the user is wearing the smart watch 100, whether the smart watch 100 is paired with the external digital device 200, or the distance between the smart watch 100 and the external digital device 200.

On the other hand, in determining a notification device including at least one of the smart watch 100 and the external digital device 200 in this disclosure, the external digital device 200 may be set to a main device and the smart watch 100 may be set to a sub device. In this case, the external digital device 200 has priority over the smart watch 100 as the notification device under the same condition so that the external digital device 200 may provide the notification to the user. Conversely to the above case, the smart watch 100 may be set to the main device and the external digital device 200 may be set to the sub device. Notably, in description of this disclosure, the external digital device 200 is assumed to be the main device.

In consideration of the above description, the disclosure is directed to a method for determining which device will provide a notification of an event occurring in at least one of the smart watch 100 and the external digital device 200, in the smart watch 100 paired with the external digital device 200. More specifically, the disclosure is directed to a method for the smart watch 100 to determine a notification device based on wearing/non-wearing of the smart watch and the distance between the smart watch 100 and the external digital device 200.

In one embodiment, the smart watch 100 may determine the notification device that provides a notification for at least one of the smart watch 100 and the external digital device 200, based on a smart watch worn mode or unworn mode. For example, in the smart watch worn mode, the smart watch 100 may determine the smart watch 100 as the notification device. In this case, the smart watch 100 may provide a notification of an event occurring in at least one of the smart watch 100 and the external digital device 200. For instance, in the smart watch unworn mode, the smart watch 100 may determine the external digital device 200 as the notification device. At this time, the smart watch 100 may transmit a notification start signal to the external digital device 200 so that the external digital device may provide a notification of an event occurring in at least one of the smart watch 100 and the external digital device 200.

In another embodiment, the smart watch 100 may determine the notification device that provides the notification for at least one of the smart watch 100 and the external digital device 200, according to whether there is the external digital device 200 paired with the smart watch 100. For example, the smart watch 100 may determine the smart watch 100 as the notification device when the external digital device 200 is not paired therewith. Further, for example, the smart watch 100 may determine at least one of the smart watch 100 and the external digital device 200 as the notification device, when the external digital device 200 is paired therewith.

As still another example, the smart watch 100 may determine the notification device that provides a notification as at least one of the smart watch 100 and the external digital device 200, based on a distance between the smart watch 100 and the external digital device 200 paired with the smart watch 100. For example, if the smart watch 100 and the external digital device 200 are within a preset distance, the external digital device 200 may be determined as the notification device. In addition, if the smart watch 100 and the external digital device 200 are separated by more than a preset distance, the smart watch 100 and the external digital device may be determined as the notification device.

Furthermore, the smart watch 100 may determine the notification device based on the mode of the smart watch 100 and the distance between the smart watch 100 and the external digital device 200. This will be described with reference to embodiments of FIGS. 3 to 7.

FIG. 3 is a diagram illustrating a first embodiment of a control method of a smart watch according to an embodiment of the disclosure. More specifically, FIG. 3 illustrates determination of the notification device in the smart watch worn mode when the smart watch 100 and the external digital device 200 are spaced by a distance d1 within a preset distance d.

First, the smart watch 100 may detect the mode of the smart watch 100. The mode of the smart watch 100 may include a smart watch worn mode and a smart watch unworn mode. The mode of the smart watch 100 may be determined according to whether there is an input signal for the rear surface (not shown) of the smart watch 100 or whether there is an input signal for the buckle (not shown) of the smart watch 100, as described previously with reference to FIG. 1. For example, if the smart watch 100 detects an input signal from a user 10, i.e. a contact signal, at the rear surface (not shown) of the smart watch 100, the smart watch 100 may recognize the input signal as the smart watch worn mode. In addition, if the smart watch 100 detects an input signal for the buckle (not shown) from the smart watch 100, i.e. a fastened signal of the buckle (not shown), the smart watch 100 may recognize the input signal as the smart watch worn mode. Further, if the smart watch 100 detects both an input signal for the rear surface (not shown) thereof and an input signal for the buckle (not shown) thereof, the smart watch 100 may determine that the smart watch is in the worn mode. Referring to FIG. 3, since the user is wearing the smart watch 100, the smart watch 100 may recognize the mode thereof as the smart watch worn mode.

Also, the smart watch 100 may also detect the external digital device 200 paired therewith. As described with reference to FIG. 2, the smart watch 100 may perform pairing with the various external digital devices 200 capable of performing data communication to transmit/receive data with the external digital device 200. Referring to FIG. 3, the smart watch 100 may detect the external digital device, i.e. a smart phone, paired therewith.

Next, the smart watch 100 may detect an event occurring in at least one of the smart watch 100 and the external digital device 200. Herein, the occurred event indicates occurrence of mode change while the user 10 uses the smart watch 100 or the external digital device 200. As described above with reference to FIG. 2, the occurred event may include an incoming telephone call, text message reception, powering down, weather alert, scheduled alarm, etc. Referring to FIG. 3, the occurred event may correspond to an incoming telephone call event occurring in at least one of the smart watch 100 and the external digital device 200.

Next, the smart watch 100 may provide a notification of an event occurring in at least one of the smart watch 100 and the external digital device 200 through a notification device. More specifically, the smart watch 100 may determine the notification device that provides a notification of an event occurring in at least one of the smart watch 100 and the external digital device 200 and provide a notification at the determined notification device. The notification of the event occurring in at least one of the smart watch 100 and the external digital device 200 may include a speech notification, a text message notification, a vibration notification, and an image notification.

Referring to FIG. 3, the smart watch 100 is spaced from the paired external digital device 200 by d1 in the smart watch worn mode. In this case, the distance d1 may be shorter than the preset distance d. That is, d1 may be within the preset distance. The distance between the smart watch 100 and the external digital device 200 may be obtained based on transmission/reception of a signal between the paired devices. In this case, the smart watch 100 may determine itself as the notification device because, when the user 10 is wearing the smart watch 10, event notification through the smart watch is simple, although the external digital device 200 corresponds to the main device. Therefore, referring to FIG. 3, upon detecting an incoming telephone call event, the smart watch 100 may provide a notification related to an incoming telephone call there through in response to the detected event.

Meanwhile, when the smart watch 100 detects an input signal during provision a notification 20 through the smart watch 100, the smart watch 100 may terminated to provide the notification 20. This is because detection of an input signal for the smart watch 100 during provision of the notification 20 indicates that the user 10 has received the notification 20. The input signal for the smart watch 100 may include touch input, voice input, gesture input, eye gaze input, etc.

Through the above-described embodiment, the user 10 can easily recognize an event occurred through the smart watch 100 in the smart watch worn mode.

Figure 4:
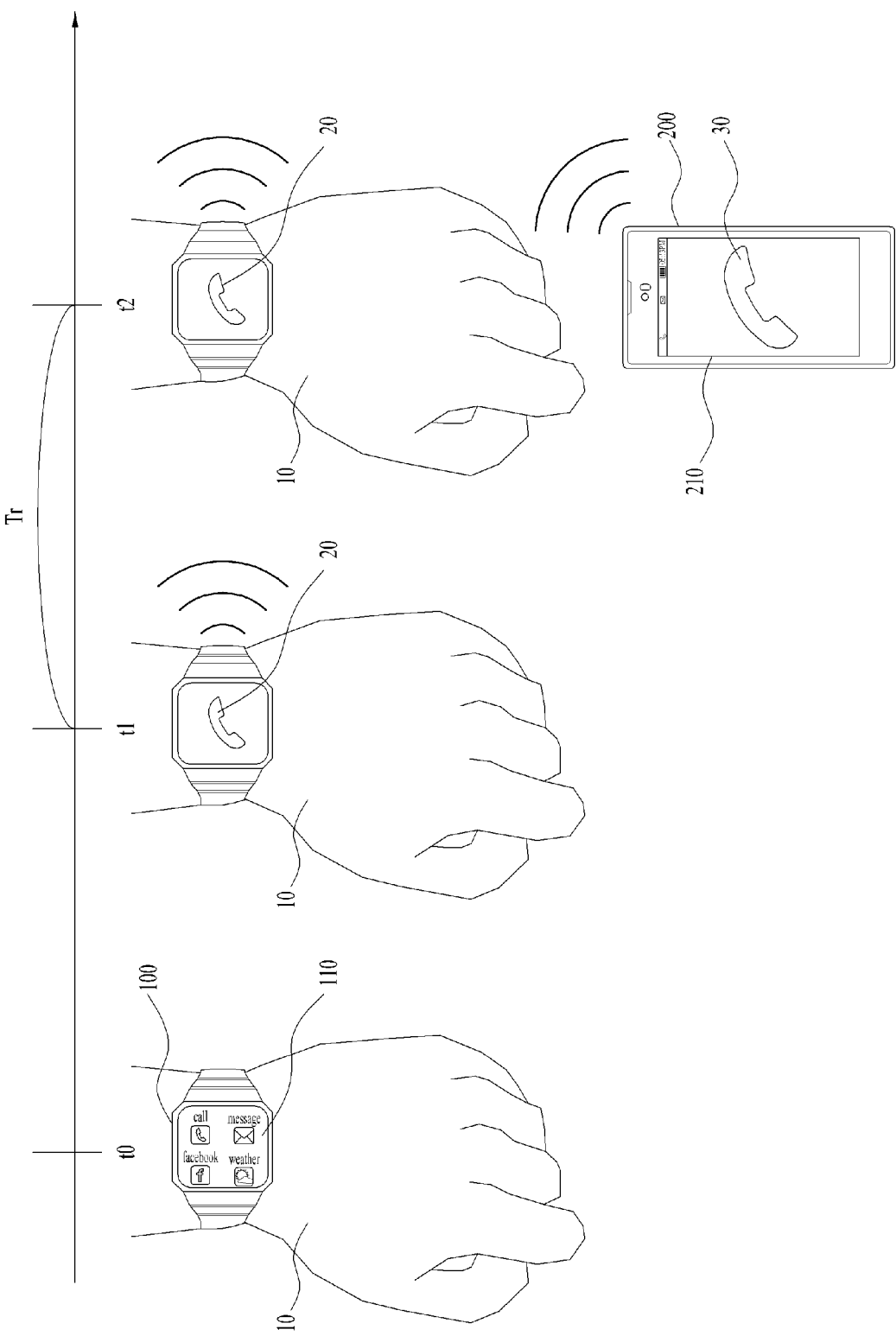
FIG. 4 is a diagram illustrating a change in the first embodiment of FIG. 3 over time.

FIG. 4 is a diagram illustrating a change in the first embodiment of FIG. 3 over time. More specifically, FIG. 4 illustrates the case where an input signal for the smart watch 100, which is a notification device, is not detected for a preset time Tr during which a notification is provided.

The smart watch 100 may detect a smart watch worn mode (time t0). Next, the smart watch 100 may be determined as the notification device as described with reference to FIG. 4 and may provide a notification of a occurred event (time t1). Referring to FIG. 4, the occurred event may correspond to an incoming telephone call.

Meanwhile, the smart watch 100 may provide a notification during the preset time Tr. However, for the preset time Tr during which the notification is provided, the smart watch 100 may detect lack of an input signal. Herein, the input signal for the smart watch 100 may correspond to a signal indicating that the user 10 has recognized an event occurred through the notification. In addition, the input signal for the smart watch 100 may include a touch input signal, a voice input signal, and a gesture input signal. For example, when the notification is provided through the display unit 110 of the smart watch 100, the user may touch the display unit 110 to recognize occurrence of an event. The preset time Tr may indicate a reference time provided by the notification 20 in order to detect the input signal. For example, when a speech notification is provided, the reference time may correspond to duration of the speech notification. When a vibration notification, for example, is provided, the reference time may correspond to a preset number of vibrations.

In this case, the smart watch 100 may re-determine the notification device in response to absence of the input signal for the smart watch 100 for the preset time Tr. That is, the notification device is changed in consideration of the fact that the user 10 does not recognize the provided notification. Accordingly, the smart watch 100 may determine the smart watch 100 and the external digital device 200 as the notification devices (time t2). At that time, the smart watch 100 may transmit a notification start signal to the external digital device 200. Next, the smart watch 100 may provide notifications 20 and 30 using both the smart watch 100 and the external digital device 200. Thus, the notification informing the user 10 of occurrence of an event is provided through not only the smart watch 100 but also the external digital device 200 to a user 10.

Through the above-described embodiment, if the user does not recognize a notification provided through the set notification device, the smart watch 100 re-determines the notification device so that the notification of the occurred event can be provided to the user through various devices.

Figure 5:
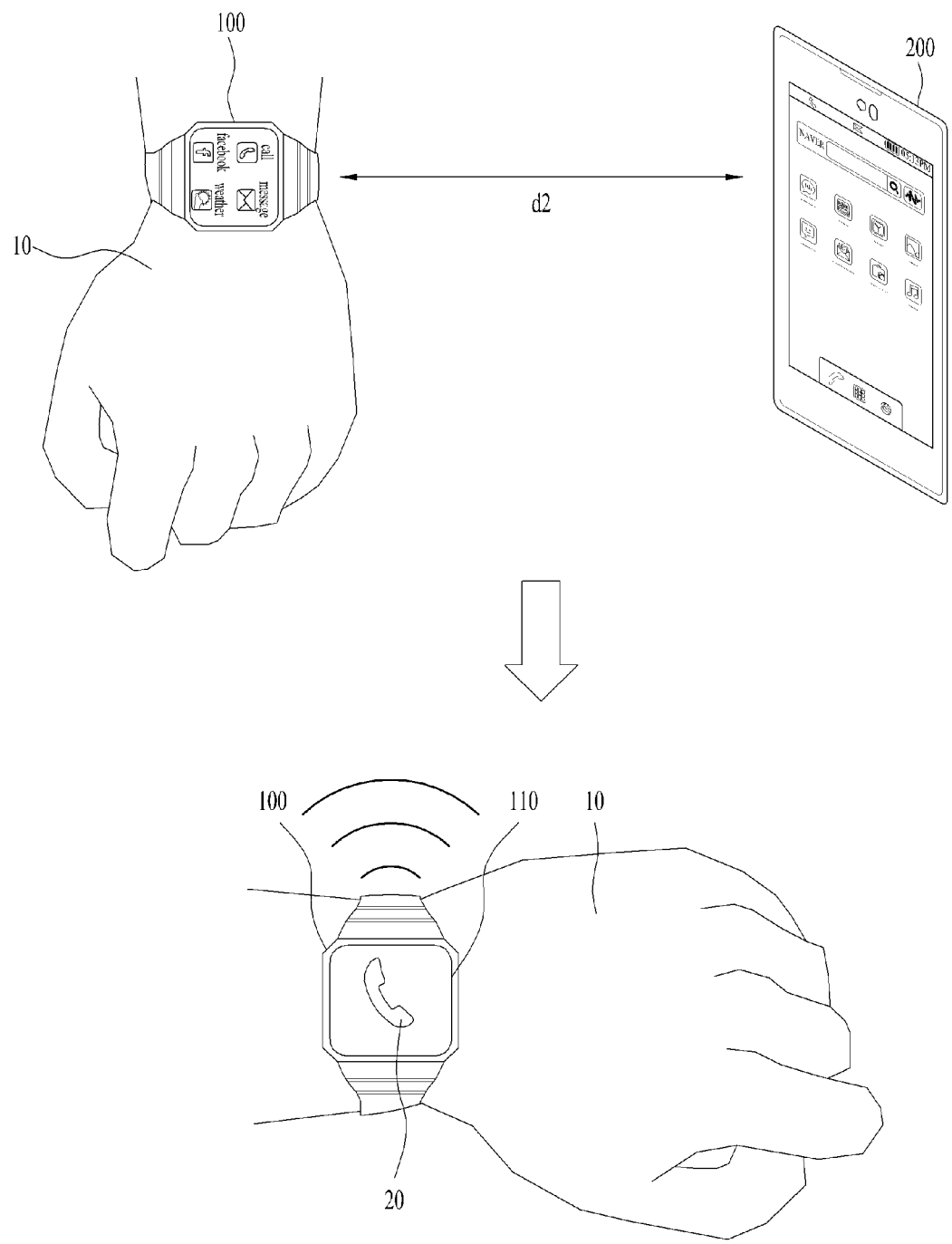
FIG. 5 is a diagram illustrating a second embodiment of a control method of a smart watch according to an embodiment of the disclosure.

FIG. 5 is a diagram illustrating a second embodiment of a control method of a smart watch according to an embodiment of the disclosure. More specifically, FIG. 5 illustrates determination of a notification device in the smart watch worn mode when the smart watch 100 and the external digital device 200 are separated by distance d2 exceeding a preset distance d.

First, the smart watch 100 may detect the mode of the smart watch 100. Referring to FIG. 5, the smart watch 100 may detect the worn mode. The smart watch 100 may detect the external digital device 200 paired therewith. Referring to FIG. 5, the smart watch 100 may detect the external digital device, i.e. a smart phone, paired therewith.

Next, the smart watch 100 may detect an event occurring in at least one of the smart watch 100 and the external digital device 200. Referring to FIG. 5, the occurred event may correspond to an incoming telephone call event occurring in at least one of the smart watch 100 and the external digital device 200. Next, the smart watch 100 may provide a notification 20 of the event occurring in at least one of the smart watch 100 and the external digital device 200.

Referring to FIG. 5, the smart watch 100 is separated by d2 from the external digital device 200 paired with in the smart watch worn mode. Herein, the distance d2 may be greater than the preset distance d. That is, the distance d2 may exceed the preset distance. Also, the distance between the smart watch 100 and the external digital device 200 may be obtained based on a transmission/reception signal between both devices connected through pairing. In this case, the smart watch 100 may determine itself as the notification device because it is easy for the user 10 to recognize an event through the smart watch 100 worn by the user 10, although the external digital device 200 corresponds to the main device. Therefore, referring to FIG. 5, upon detecting an incoming telephone call event, the smart watch 100 may provide a notification related to the incoming telephone call in response to the detected event. As opposed to the above description, the smart watch 100 may determine the external digital device 200 as the notification device. Then, the smart watch 100 may transmit a notification start signal to the external digital device 200. Through the above-described embodiment, the user 10 can easily recognize the event occurred through the smart watch 100 in the smart watch worn mode.

Meanwhile, if the smart watch 100 detects absence of an input signal therefor while providing a notification for a preset time as described above with reference to FIG. 4, the smart watch 100 may determine both the smart watch 100 and the external digital device 200 as notification devices. Thus, the user may receive the notification of the event occurred through the external digital device 200 as well as the smart watch 100.

FIG. 6 is a diagram illustrating a third embodiment of a control method of a smart watch according to an embodiment of the disclosure. More specifically, FIG. 6 illustrates determination of the notification device in the smart watch unworn mode when the smart watch 100 and the external digital device 200 are distanced by a distance d1 within a preset distance d.

First, the smart watch 100 may detect the mode of the smart watch 100. Referring to FIG. 6, the smart watch 100 detects absence of an input signal for at least one of the rear surface (not shown) of the smart watch 100 and the buckle (not shown) of the smart watch 100. Accordingly, the smart watch 100 may detect a smart watch unworn mode. For example, if input signals for both the rear of the smart watch 100 and the buckle of the smart watch 100 are not detected, the smart watch 100 may determine the mode as the smart watch unworn mode. In addition, the smart watch 100 may detect an external digital device 200 paired therewith. Referring to FIG. 5, the smart watch 100 may detect the external digital device 200, i.e. a smart phone, paired therewith.

Next, the smart watch 100 may detect an event occurring in at least one of the smart watch 100 and the external digital device 200. Next, the smart watch 100 may provide a notification of the event occurring in at least one of the smart watch 100 and the external digital device 200.

Referring to FIG. 6, the smart watch 100 is separated from the paired external digital device 200 by d1 in the smart watch unworn mode. In this case, the distance d1 may be shorter than the preset distance d as described with reference to FIG. 3. In this case, the smart watch 100 may determine the external digital device 200 as a notification device based on unworn mode of the smart watch and the distance d1 between the smart watch 100 and the external digital device 200. This is because, when the user 10 is not wearing the smart watch 10, an event may be more easily recognized through the external digital device 200 which is a main device. Therefore, referring to FIG. 6, when the smart watch detects an incoming telephone call event, the external digital device 200 may provide a notification related to the incoming telephone call there through in response to the detected event. In this case, the smart watch 100 may transmit a notification start signal indicating that a notification related to an incoming telephone call should be started to the external digital device 200.

According to the above-described embodiment, in the smart watch unworn mode, the user can receive the notification of the event through the external digital device that is capable of easily recognizing the notification relative to the smart watch 100.

Meanwhile, the smart watch 100 may detect a smart watch grip signal of the user 10 while providing the notification of the event occurred through the external digital device 200. In this case, since the user may be positioned in the vicinity of the smart watch 100 despite not wearing the smart watch, the smart watch 100 may re-determine itself as the notification device.

In the embodiment of FIG. 6, the smart watch 100 may detect absence of an input signal for the external digital device 200 while providing the notification 30 through the external digital device 200 for the preset time. In this case, the smart watch 100 may determine itself as well as the external digital device 200 as notification devices and provide the notification 30 to the user.

Figure 7:
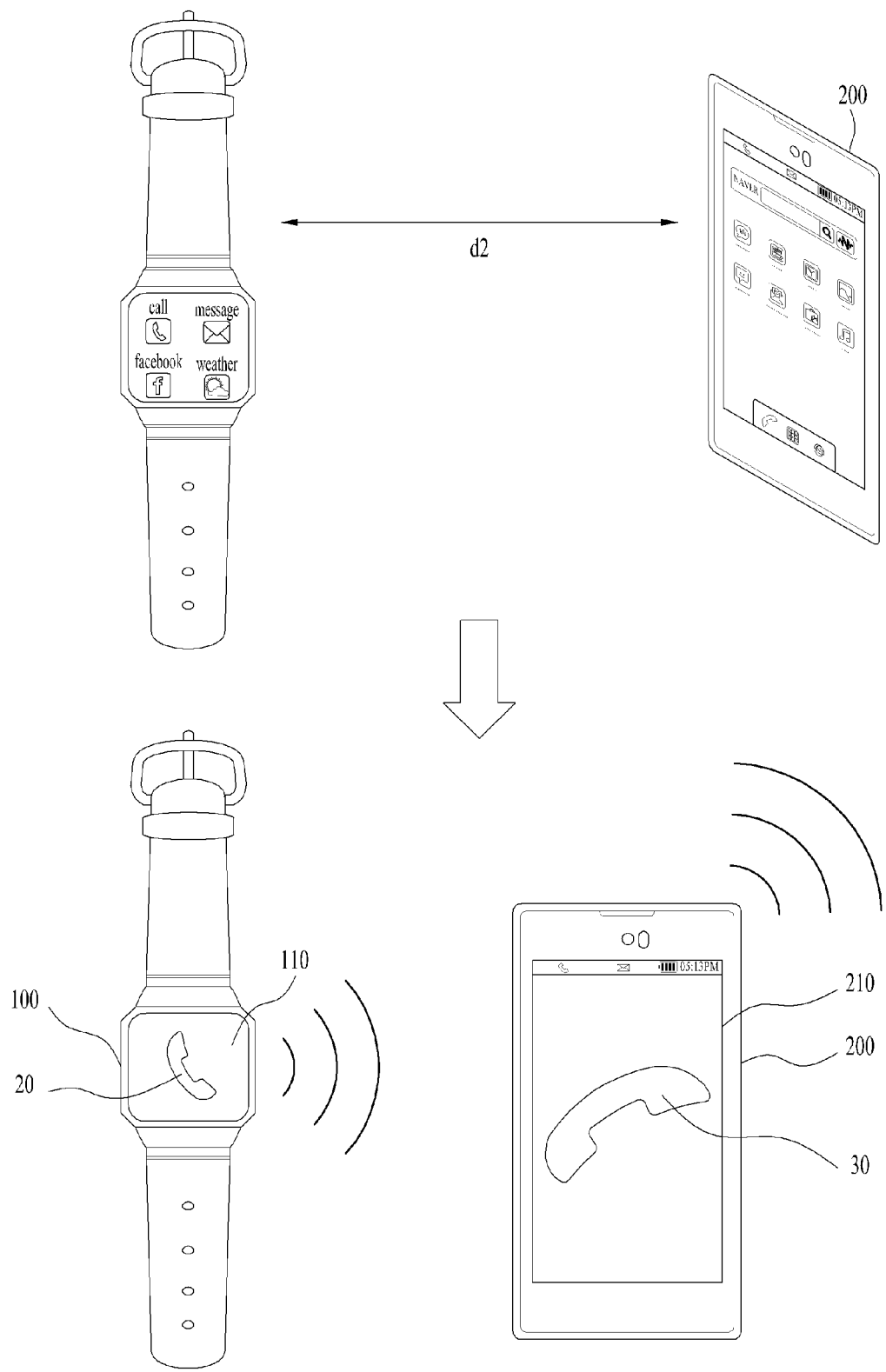
FIG. 7 is a diagram illustrating a fourth embodiment of a control method of a smart watch according to an embodiment of the disclosure.

FIG. 7 is a diagram illustrating a fourth embodiment of a control method of a smart watch according to an embodiment of the disclosure. More specifically, FIG. 7 illustrates determination of a notification device in the smart watch unworn mode when the smart watch 100 and the external digital device 200 are separated by d2 exceeding a preset distance d.

First, the smart watch 100 may detect mode of the smart watch 100. Referring to FIG. 7, the smart watch 100 may recognize the smart watch mode as the unworn mode. The smart watch 100 may detect the external digital device 200 paired therewith. Referring to FIG. 7, the smart watch 100 may detect the external digital device, i.e. a smart phone, paired therewith. Next, the smart watch 100 may detect an event occurring in at least of the smart watch 100 and the external digital device 200. The smart watch 100 may provide a notification of an event occurring in at least one of the smart watch 100 and the external digital device 200.

Referring to FIG. 7, the smart watch 100 is spaced by d2 from the external digital device 200 paired therewith in a smart watch unworn mode. The distance d2 may be greater than the preset distance d as described with reference to FIG. 5. In this case, the smart watch 100 may determine the smart watch 100 and the external digital device 200 as notification devices. Since the smart watch 100 does not know which device is nearer the user when the distance between the smart watch and the external device exceeds the preset distance in the smart watch unworn mode, the smart watch 100 may provide a notification of a occurred event using both the smart watch and the external digital device 200. Therefore, referring to FIG. 7, upon detecting an incoming telephone call event, the smart watch 100 may provide a notification 20 related to the incoming telephone call there through in response to the detected event. Further, upon detecting the incoming telephone call event, the smart watch 100 may transmit a notification start signal to the external digital device 200.

Meanwhile, when notifications 20 and 30 are provided through the smart watch 100 and the external digital device 200, the smart watch 100 may differently control strength levels of the notifications provided by the smart watch 100 and the external digital device 200. Here, the strength levels of the notifications may correspond to strength levels of signals providing the notifications. For example, the strength level of the notification may include volume of a speech notification, font size of a text message notification, vibration strength of a vibration notification, etc.

According to the above-described embodiment, the user can recognize a notification provided by a device nearer the smart watch 100 and the external digital device 200 in a smart watch non-wearing state.

Figure 8:
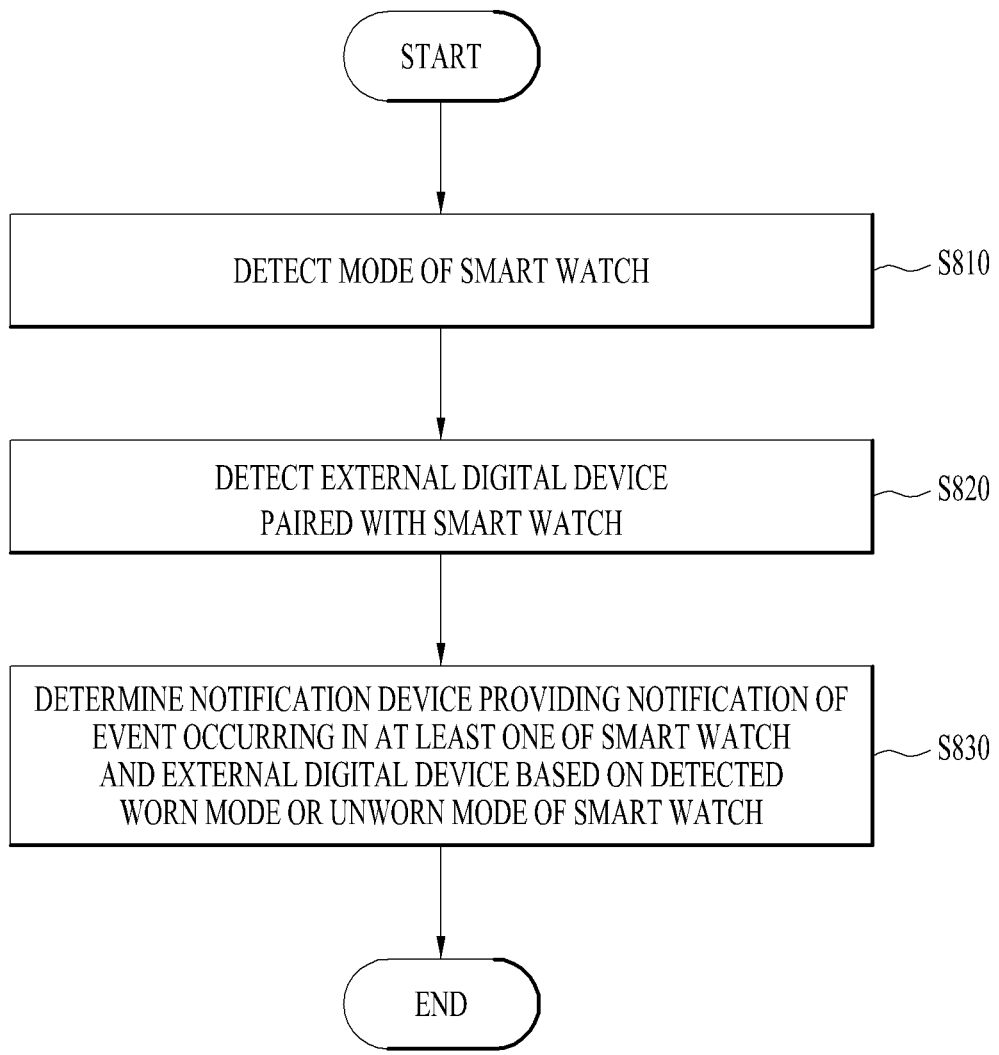
FIG. 8 is a flowchart illustrating a control method of a smart watch of the disclosure.

FIG. 8 is a flowchart illustrating a control method of a smart watch of the disclosure. In the following description, each step of FIG. 8 may be controlled by the processor 140 of the smart watch 100 shown in FIG. 1.

First, the smart watch may detect a smart watch mode (step S810). As described with reference to FIG. 2, the smart watch mode may include a worn mode and a unworn mode. The smart watch mode may be determined based on at least one of an input signal for the rear surface of the smart watch and an input signal for the buckle of the smart watch.

Next, the smart watch may detect an external digital device paired with the smart watch (step S820). As described with reference to FIG. 2, the smart watch may perform communication through pairing with the external digital device. The external digital device may correspond to a digital device capable of communicating with the smart watch.

Next, the smart watch may determine a notification device providing a notification of an event occurring in at least one of the smart watch and the external digital device (step S830). In this case, the smart watch may detect the event occurring in at least one of the smart watch and the external digital device. The smart watch may obtain the distance between the smart watch and the external digital device and determine the notification device which provides the notification of the event, based on the worn mode or unworn mode of the smart watch and the obtained distance between the smart watch and the external digital device. Here, the notification device may correspond to at least one of the smart watch and the external digital device as described with reference to FIG. 1. The event occurring in at least one of the smart watch and the external digital device relates to a state change occurred from the smart watch or the external digital device and may include an incoming telephone call, text message reception, scheduled alarm, etc. Upon detecting an input signal for the notification device while providing the notification, the smart watch may stop providing the notification. In this case, the input signal may include a touch input signal, an eye gaze input signal, a voice input signal, a gesture input signal, etc.

Figure 9:
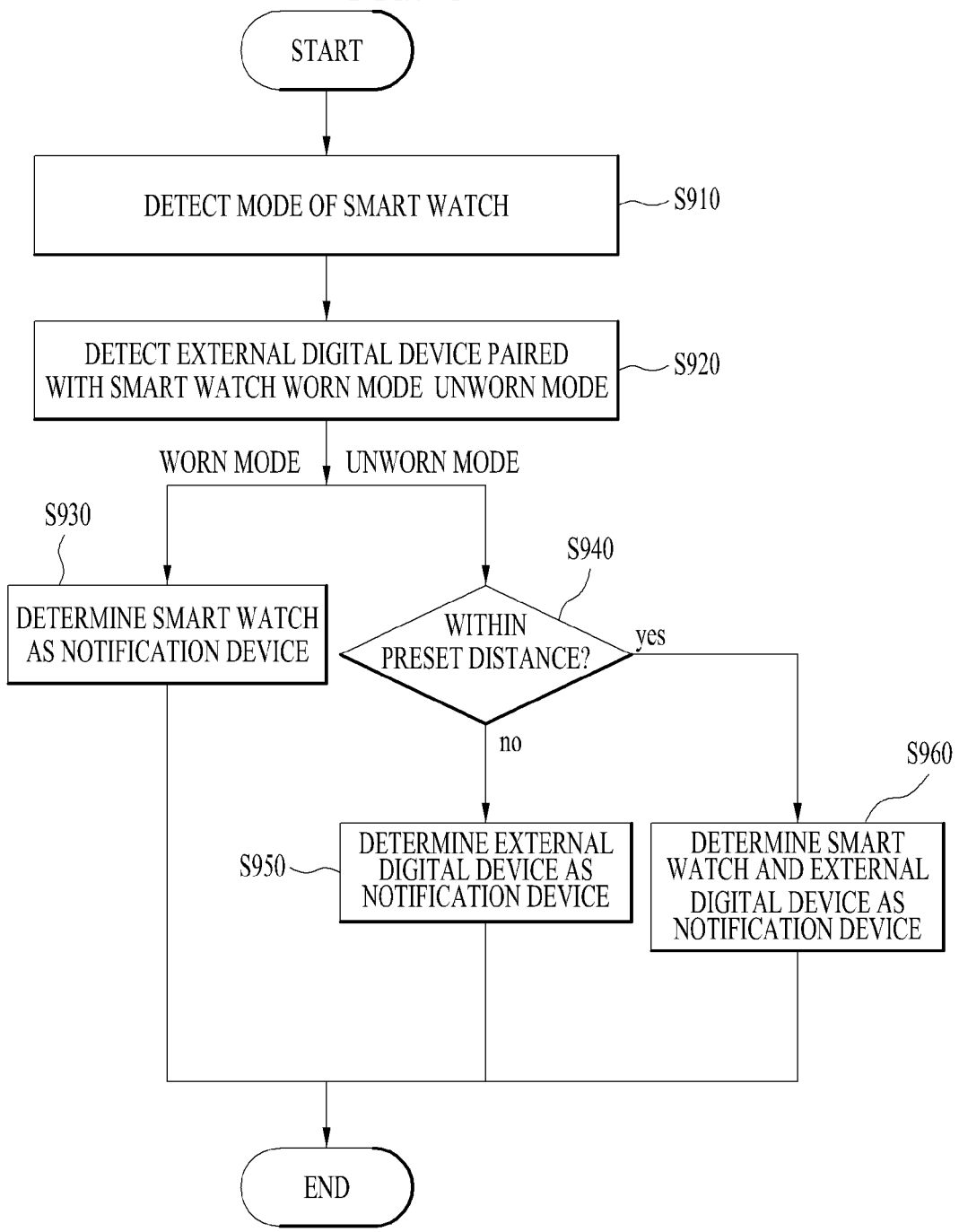
FIG. 9 is a flowchart illustrating a control method of a smart watch of the disclosure.

FIG. 9 is a flowchart illustrating a control method of a smart watch of the disclosure. In the following description, each step of FIG. 9 may be controlled by the processor 140 of the smart watch 100 shown in FIG. 1. In the embodiment of FIG. 9, parts identical or similar to the above-described embodiment of FIG. 8 will not be described in detail.

The smart watch may detect a mode thereof (step S910). Next, the smart watch may detect an external digital device paired therewith (step S920).

Next, if the smart watch is in a worn mode, the smart watch may determine itself as a notification device (step S930). As described with reference to FIG. 4, if a notification of an event is provided from the smart watch, the smart watch may detect absence of an input signal for the smart watch for a preset time. In this case, the smart watch may transmit a notification start signal to the external digital device in response to absence of the detected input signal. Here, the input signal for the smart watch may include signals in response to eye gaze, voice, touch, gesture, etc. of a user.

Meanwhile, if the smart watch is in a unworn mode, the smart watch may determine whether the distance between the smart watch and the external digital device is within a preset distance (step S940). Here, the preset distance may correspond to a distance set by the user or a distance automatically set between the smart watch and the external digital device. The distance between the smart watch and the external digital device may be obtained based on a transmission/reception signal between both devices connected through pairing.

In step S940, if the distance between the smart watch and the external digital device exceeds the preset distance, the smart watch may determine the external digital device as a notification device (step S950). In this case, if a smart watch grip signal is detected in a smart watch non-wearing state as described with reference to FIG. 6, the smart watch may determine the smart watch as the notification device.

In step S940, if the distance between the smart watch and the external digital device is within the preset distance, the smart watch may determine itself and the external digital device as notification devices (step S960). As described with reference to FIG. 7, the smart watch may provide a notification of an event occurring in at least one of the smart watch and the external digital device. The smart watch may transmit a notification start signal to the external digital device.

While the disclosure has been described with reference to separate drawings for convenience, a new embodiment may be implemented by combining embodiments illustrated in the drawings. When needed, designing a computer-readable recording medium, in which a program for implementing the afore-described embodiments is recorded, is within the scope of the disclosure.

The smart watch and the method for controlling the same according to the disclosure are not limited to the configurations and methods of the exemplary embodiments set forth herein. The exemplary embodiments may be selectively combined in part or in whole to form various embodiments that all fall within the scope of the disclosure.

Meanwhile, the smart watch and the control method therefor according to the disclosure may be implemented as code that can be written on a processor-readable recording medium and thus read by a processor provided in a networked device. The processor-readable recording medium may be any type of recording device in which data is stored in a processor-readable manner. The processor-readable recording medium may include, for example, a ROM, a RAM, a magnetic tape, a floppy disc, and an optical data storage device and may be implemented in the form of a carrier wave transmitted over the Internet. The processor-readable recording medium can be distributed over a plurality of computer systems connected to a network so that processor-readable code is written thereto and executed therefrom in a decentralized manner.

As is apparent from the above description, according to an embodiment, when an event such as a phone call occurs while a user uses a smart watch and an external digital device paired with the smart watch, the user can easily recognize occurrence of the event through notification provided by a notification device.

According to an embodiment, when an event such as a phone call occurs, the user can easily recognize occurrence of the event through a notification device enabling effective notification of the event, wherein the notification device is based on at least one of wearing/non-wearing of a smart watch, pairing/non-pairing between the smart watch and an external digital device, and a distance between the smart watch and the external digital device.

In addition, according to an embodiment, when an input signal from a user is not detected while a notification is provided with respect to a smart watch or an external digital device for a preset time, the user can easily recognize occurrence of an event through a changed notification device.

While the disclosure has been particularly shown and described with reference to exemplary embodiments, it will be understood by those of ordinary skill in the art that various changes in form and details may be made therein without departing from the spirit and scope of the disclosure as defined by the following claims.

Both a device and a method are described in this the disclosure and their descriptions may be complementarily applied as necessary.

What is claimed is:

1. A smart watch comprising:
a display unit configured to display content;
a sensor unit configured to detect an input signal and transmit the detected input signal to a processor;
a communication unit configured to transmit/receive data; and
the processor configured to control the display unit, the sensor unit, and the communication unit,
wherein the processor is configured to:
detect a mode of the smart watch, wherein the mode of the smart watch includes a worn mode and an unworn mode of the smart watch,
detect an external digital device paired with the smart watch,
obtain a distance between the smart watch and the external digital device, and
determine a notification device providing a notification of an event occurring in at least one of the smart watch and the external digital device based on the detected worn mode or unworn mode of the smart watch and based on the distance between the smart watch and the external device, wherein the notification device includes at least one of the smart watch and the external digital device.

2. The smart watch according to claim 1, wherein the processor is further configured to determine the smart watch as the notification device, if the smart watch is in the worn mode.

3. The smart watch according to claim 1, wherein the processor is further configured to determine the external digital device as the notification device, if the smart watch is in the unworn mode.

4. The smart watch according to claim 3, wherein the processor is further configured to determine the smart watch as the notification device, if the smart watch detect a grip signal of a user with respect to the smart watch in the unworn mode.

5. The smart watch according to claim 1, wherein the processor is further configured to determine the external digital device as the notification device, if the distance between the smart watch and the external digital device is within a preset distance.

6. The smart watch according to claim 1, wherein the processor is further configured to determine the smart watch and the external digital device as the notification device, if the distance between the smart watch and the external digital device is not within a preset distance.

7. The smart watch according to claim 6, wherein the processor is further configured to detect absence of an input signal with respect to the external digital device for a preset time, if the notification of the event is provided by the external digital device, and
determine the smart watch and the external digital device as the notification device in response to the detected absence of the input signal.

8. The smart watch according to claim 2, wherein the processor is further configured to detect absence of an input signal with respect to the smart watch for a preset time, if the notification of the event is provided by the smart watch, and
determine the smart watch and the external digital device as the notification device in response to the detected absence of the input signal.

9. The smart watch according to claim 8, wherein the input signal for the smart watch includes at least one of gaze, voice, touch, and gesture of a user.

10. The smart watch according to claim 1, wherein the processor is further configured to adjust strength level of notifications of the smart watch and the external digital device differently, if the smart watch and the external digital device are determined as the notification device.

11. The smart watch according to claim 1, wherein the notification of the event includes at least one of a speech notification, a text message notification, a vibration notification, and an image notification.

12. The smart watch according to claim 1, wherein the worn mode or unworn mode of the smart watch is determined based on at least one of an input signal for the rear surface of smart watch and an input signal for a buckle of the smart watch.

13. The smart watch according to claim 1, wherein the processor is further configured to provide the notification via the smart watch, if the smart watch is determined as the notification device, and,
transmit a notification start signal to the external digital device, if the external digital device is determined as the notification device.

14. The smart watch according to claim 13, wherein the processor is further configured to terminate providing the notification, if an input signal for the notification device is detected while providing the notification.

15. The smart watch according to claim 1, wherein the processor is further configured to determine the external digital device as a main device and the smart watch as a sub device.

16. The smart watch according to claim 1, wherein the processor is further configured to detect the event occurring in at least one of the smart watch and the external digital device.

17. A method for controlling a smart watch, comprising:
detecting a mode of the smart watch, wherein the mode of the smart watch includes a worn mode and an unworn mode of the smart watch;
detecting an external digital device paired with the smart watch;
obtaining a distance between the smart watch and the external digital device; and
determining a notification device providing a notification of an event occurring in at least one of the smart watch and the external digital device based on the worn mode or unworn mode of the smart watch and based on the distance between the smart watch and the external digital device, wherein the notification device includes at least one of the smart watch and the external digital device.

18. The method according to claim 17, further comprising determining the external digital device as the notification device in the unworn mode of the smart watch.

\* \* \* \* \*